United States Patent [19]
Catheline et al.

[11] Patent Number: 5,267,684
[45] Date of Patent: Dec. 7, 1993

[54] METHOD FOR BRAZING AN ELEMENT TRANSVERSELY TO A WALL, A BRAZED-JOINT ASSEMBLY FOR CARRYING OUT SAID METHOD, AND A PACKAGE FOR ELECTRONIC COMPONENTS

[75] Inventors: Marc Catheline, Chatillon Sous Bagneux; Jean-Noël Dody, Plaisir; Jean-Pierre Maquaire, Louveciennes, all of France

[73] Assignee: Egide S.A., Trappes, France

[21] Appl. No.: 794,123

[22] Filed: Nov. 15, 1991

[30] Foreign Application Priority Data

Nov. 16, 1990 [FR] France ................................ 90 14278

[51] Int. Cl.⁵ ................... H01L 23/02; B23K 101/36
[52] U.S. Cl. .............................. 228/262.1; 228/56.3; 174/152 GM; 257/699; 403/272
[58] Field of Search ............... 228/134, 245, 246, 255, 228/258, 563, 122, 263.12, 263.11; 403/265, 270, 271, 272, 268, 179; 174/152 GM; 257/698, 699; 385/94, 138

[56] References Cited

U.S. PATENT DOCUMENTS

| | | | |
|---|---|---|---|
| 3,029,505 | 4/1962 | Reichenbaum | 228/258 |
| 3,078,551 | 2/1963 | Patriarca et al. | 228/134 |
| 3,837,688 | 9/1974 | Vollbehr | 228/134 |
| 4,119,363 | 10/1978 | Camlibel et al. | 228/263.12 |
| 4,180,700 | 12/1979 | Kraska et al. | 228/263.12 |
| 4,186,994 | 2/1980 | Denkin et al. | 385/94 |
| 4,217,137 | 8/1980 | Kraska et al. | 228/122 |
| 4,841,101 | 6/1989 | Pollock | 228/258 |

*Primary Examiner*—Samuel M. Heinrich
*Attorney, Agent, or Firm*—Felfe & Lynch

[57] ABSTRACT

A reservoir for the introduction of a preform of solid brazing filler metal is formed by a recess in the outer wall of an electronic component package and opens into a package through-hole. A lead-wire and bushing are placed within the through-hole with allowance for a clearance space so as to permit liquefaction and capillary diffusion of the filler metal within the space.

8 Claims, 1 Drawing Sheet

METHOD FOR BRAZING AN ELEMENT TRANSVERSELY TO A WALL, A BRAZED-JOINT ASSEMBLY FOR CARRYING OUT SAID METHOD, AND A PACKAGE FOR ELECTRONIC COMPONENTS

BACKGROUND OF THE INVENTION

1. Field of the Invention

The present invention relates to a method for brazing an element transversely to a wall and to a brazed-joint assembly for carrying out said method.

The invention is more particularly applicable to formation of a hermetically sealed and electrically insulating joint between an electric conductor and a wall of electrically conductive material through which the conductor passes.

Within this framework, the invention is primarily concerned with the construction of a package for electronic components.

2. Description of the Prior Art

Brazing of an element transversely to a wall presents a problem of supply of brazing filler metal to the surfaces to be joined together. In fact, if the brazing filler metal fails to join all the portions of surface of the transverse element to the internal surface of a receiving hole in which the element is engaged, this has an adverse effect on the mechanical strength of the assembly thus formed.

Moreover, when the objective to be achieved is provide a hermetically sealed joint connection between a wall and a so-called lead-through element which passes through the wall, discontinuities of contact of the brazing filler metal between all the oppositely-facing portions of surface are liable to result in faulty air-tightness of the joint connection.

Furthermore, in this case also, the supply of brazing filler metal is particularly complex whenever the surfaces to be brazed to each other are not directly accessible.

For this purpose, a solution which is usually adopted consists in employing an annular preform of solid brazing filler metal in which the lead-through element is engaged prior to its introduction in the receiving hole, then in causing liquefaction of the brazing metal preform while simultaneously applying a transverse pressure on the lead-through element in the direction of the wall in which the brazing metal preform is located so as to drive the liquid brazing metal into the interstice which remains between the element and the hole. This pressure is necessary in order to locate the lead-through element in its final position, taking into account the fact that the thickness of the solid brazing metal preform induces a displacement in the initial positioning of the element.

A further drawback of the solution considered above lies in the need to provide a preform of solid brazing filler metal having dimensions proportionately greater than the volume of filler metal which is necessary, this being due to the fact that, when pressure is applied, a quantity of liquid brazing filler metal is discharged from the through-hole at the end opposite to the opening through which the element is introduced. This not only affects the economic feasibility of the system but forms dirty deposits on the end product.

Furthermore, this solution does not make it possible to ensure that all the portions of surface of the element are joined by brazing to all the portions of surface of the through-hole.

It is also worthy of note that preforms of solid brazing filler metal usually contain impurities which have an adverse effect on the mechanical strength and air-tightness of the joint formed and which are introduced at the time of liquefaction within the interstice between the element and the through-hole.

SUMMARY OF THE INVENTION

The primary object of the present invention is therefore to overcome the disadvantages described in the foregoing.

In accordance with its principal feature, the present invention relates to a method for brazing an element transversely to a wall and essentially consists:

in forming in said wall, in the vicinity of a through-hole which receives said element, a reservoir which is intended to receive a preform of solid brazing filler metal and opens into said through-hole;

in positioning said element with provision for a clearance space within said receiving through-hole;

in placing a preform of solid brazing filler metal within said reservoir;

and in causing liquefaction and capillary diffusion of the brazing filler metal within said clearance space.

By means of this method, the element to be brazed to the wall can be placed in its final position before the brazing filler metal is introduced. This offers an undoubted advantage, particularly in the event that stringent requirements of accurate positioning have to be complied with for the joint to be formed. Furthermore, it is observed that, by capillarity effect during liquefaction of the preform of solid brazing filler metal, the impurities contained therein remain within the reservoir and are not liable to contaminate the brazed joint which is formed.

Furthermore, capillary diffusion of the liquid brazing filler metal prevents any overflow of filler metal from the through-hole, thus leading on the one hand to an economy of brazing material and on the other hand to the final achievement of a cleaner joint.

As an advantageous feature, the above-mentioned reservoir is so arranged as to provide a charging access once the element has been positioned within the through-hole. Said charging access permits the introduction of a preform of solid brazing filler metal on the wall face through which said element is engaged in order to be positioned within the through-hole.

In accordance with an advantageous feature of the invention, the reservoir is so dimensioned as to receive a preform of solid brazing filler metal, said preform being in turn dimensioned in order to permit filling of the clearance space between the lead-through element and the through-hole and to obtain an air-tight joint.

This feature permits an appreciable saving of brazing materials since it will in future be sufficient to dimension the preform in accordance with the volume which is necessary in order to fill the clearance space between the lead-through element and the through-hole.

In a particularly advantageous manner and in accordance with the method of the invention, the liquefaction and diffusion operation is repeated with a fresh charge of solid brazing filler metal until a quantity of filler metal which remains within the reservoir indicates that the clearance space has been completely filled.

By means of this method, it is possible from now on to check the quality of the brazed joint by ensuring that a predetermined quantity of brazing filler metal remains within the reservoir at the end of the operation and consequently that the clearance space between the element and the through-hole is entirely filled with brazing material, thus ensuring that the filler metal is in contact with all the portions of surface of the element and of the hole.

Should it be observed that the reservoir is completely emptied at the end of the diffusion operation, the charging access permits reintroduction of a fresh charge of solid brazing metal in order to carry out complementary filling of the clearance space, which was not possible in the solutions proposed in the prior art since the solid brazing metal preform had to be placed prior to final positioning of the element.

Another object of the invention is to apply this method to the construction of a hermetically-sealed electrically-insulating joint between an electric conductor and a wall of electrically conductive material, especially in the field of fabrication of packages for electronic components.

A further object of the invention is to propose a brazed-joint assembly including a wall which is in turn provided with a through-hole for receiving a lead-through element which passes transversely through said wall and permits the practical application of the method in accordance with the invention.

Said brazed-joint assembly is advantageously provided with a lead-through element so designed as to be positioned with provision for a clearance space within the receiving hole of the wall. Said wall advantageously has a reservoir provided on the face through which said lead-through element is inserted with a charging access which permits introduction of a preform of solid brazing filler metal.

In accordance with a particularly advantageous feature of the invention, the reservoir is formed by recessing and removal of material from that face of said wall through which the lead-through element is inserted, said recess being intended to open into the receiving hole.

A particularly simple design of reservoir is thus obtained by virtue of the fact that a recess is formed in the wall face by removal of material and that said recess constitutes the reservoir while at the same time forming access means for insertion of the solid brazing metal preform.

Within the scope of the application to the construction of an electrically-insulating hermetically-sealed joint connection between an electric conductor and a wall of electrically conductive material, the lead-through element of the brazed-joint assembly in accordance with the invention contains an electric conductor surrounded by a bead of insulating material, said bead being in turn surrounded by a bushing of conductive material which is intended to be brazed to said wall and extends through said hole.

As a general rule, the bead is of glass or of ceramic material and is joined to the electric conductor and to the bushing beforehand by fusion of said glass bead so as to constitute a lead-through element, thus satisfying all the conditions of air-tightness between these components.

In accordance with another distinctive feature of the brazed-joint assembly in accordance with the invention, the bushing has a length at least equal to the thickness of the wall and also has a change of cross-section constituting a head designed to bear on that face of said wall through which the bushing is inserted in the through-hole in order to be positioned therein.

Positioning of the lead-through element within the wall prior to joining the element by brazing is thus considerably simplified on account of the fact that the change in cross-section makes it possible to engage the element within the through-hole until its head is abuttingly applied against the wall.

The length of the bushing with respect to the thickness of the wall is determined as a function in particular of the thermal characteristics of the wall and of the diameter of the electric conductor.

In fact, and especially with a view to ensuring high resistance of the bond between bead and conductor, the length of the bushing is advantageously greater in the case of a conductor having a larger diameter.

This concept of length of the bushing with respect to the thickness of the wall also varies according to the thermal stresses which determine the thickness of the wall.

Should the wall be of substantial thickness on account of its thermal characteristics, the length of the bushing will usually be of smaller value than the thickness of the wall since its length will be dependent on the technical characteristics of resistance of the bead/conductor bond.

On the other hand, in the case of a thin wall, the bushing can be of greater length than the thickness of the wall if this is made necessary by the diameter of the conductor.

In accordance with a particularly advantageous feature of the brazed-joint assembly, the reservoir has an elongated shape, one end of which opens into said through-hole in order to permit an additional saving of brazing material by reducing the portion of material which is diffused by capillarity on the walls of the reservoir.

A further object of the present invention is to propose a package for electronic components comprising at least one brazed joint obtained from a brazed-joint assembly in accordance with the method of the invention and forming a closable enclosure, the reservoir being formed by recessing and removal of material from the external face of one wall of the enclosure so as to permit easy positioning of the brazing element from the exterior as well as any introduction of fresh charges of solid brazing filler metal preforms from the exterior of the package.

Within the scope of this application to electronic packages, it is proposed to form on the corresponding walls a number of reservoirs corresponding to the number of holes through which electric conductors are intended to pass in order to establish a connection between the exterior and the interior of the package.

By means of the invention, testing of the brazed joints formed on a package of this type is particularly easy since it is only necessary to check whether there remains within each reservoir associated with a through-hole a predetermined quantity of brazing filler metal which ensures that all the brazed joints are hermetically sealed.

In the application considered, the advantage offered is all the more justified by the fact that the brazing materials employed are usually very costly when carrying out gold/tin brazing operations, for example, and that the interior of the package obtained must be free from any dirty deposits caused by running and projections of brazing metal as was the case in techniques of the prior art.

In order to ensure good diffusion by capillarity of the liquefied brazing filler metal, it is an advantage in accordance with the invention to provide both the receiving hole and the lead-through element with a curved cross-section in order to avoid the presence of sharp edges which would not be conducive to good capillary diffusion.

In practice, and especially in the case of application to electronic packages, the through-hole and the lead-through element both have a circular cross-section.

In order that the essential features and advantages of the invention may be more fully understood, a particular embodiment will now be described with reference to the accompanying drawings but solely by way of example without any limitation being implied.

BRIEF DESCRIPTION OF THE DRAWINGS

For reasons of clarity, the elements which are common to the different figures are designated by the same reference numerals.

DESCRIPTION OF THE PREFERRED EMBODIMENTS

Figure 1:
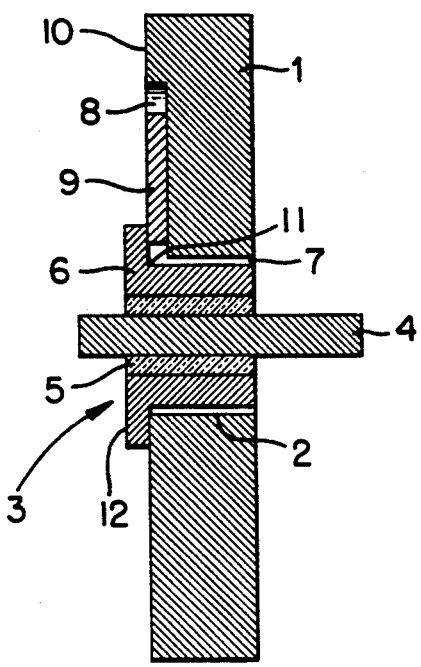
FIG. 1 is a sectional view of a brazed-joint assembly in accordance with the invention as applied to the fabrication of packages for electronic components.
Figure 2:
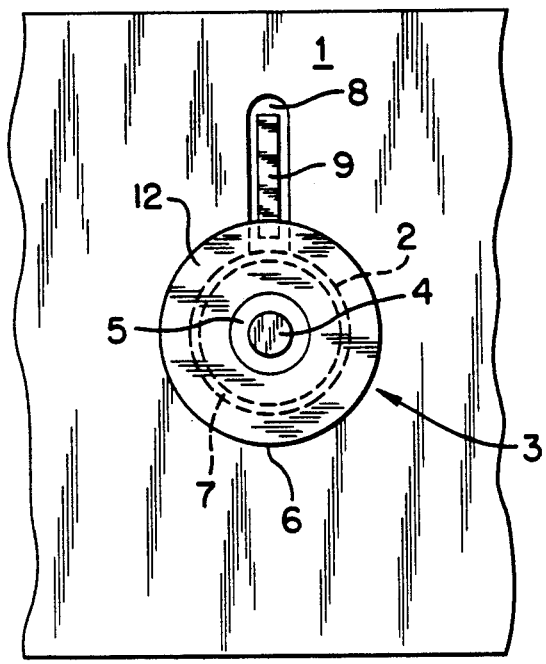
FIG. 2 is a front view of the brazed-joint assembly shown in FIG. 1.

The brazed-joint assembly shown in FIGS. 1 and 2 includes a wall 1 of electrically conductive material constituted for example by one of the walls of a package for electronic components, in which is formed a through-hole 2 for insertion of a lead-through element 3 which is in turn constituted by a conductor 4 having the intended function of making an electrical connection between the interior and the exterior of the package and surrounded by a glass or ceramic bead 5 which is in turn surrounded by a metal bushing 6.

The respective dimensions of the through-hole 2 and of the bushing 6 are such that a clearance space 7 remains between the external peripheral surface of the bushing 6 and the internal peripheral surface of the hole 2, said clearance space being designed to ensure good diffusion of the brazing filler metal by capillarity at the time of liquefaction.

A reservoir 8 which is intended to receive a solid brazing metal preform 9 is formed by recessing and removal of material from a face 10 of the wall 2 through which the lead-through element 3 is to be inserted.

The bushing 6 has a change of cross-section 11 designed to constitute a lead-through element head 12 which is intended to be applied against the face 10 of the wall 1 at the time of positioning of the lead-through element 3.

The preform 9 is so dimensioned that the clearance space 7 can be completely filled by capillary diffusion at the time of liquefaction of said preform.

The reservoir 8 has an elongated shape (as shown in FIG. 2), one end of which opens into the through-hole 2 of the wall 1.

Figure 3:
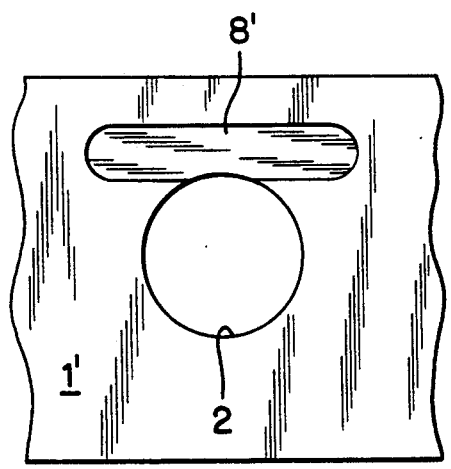
FIG. 3 illustrates an alternative form of construction of the reservoir for the supply of solid brazing filler metal in accordance with the invention.
Figure 4:
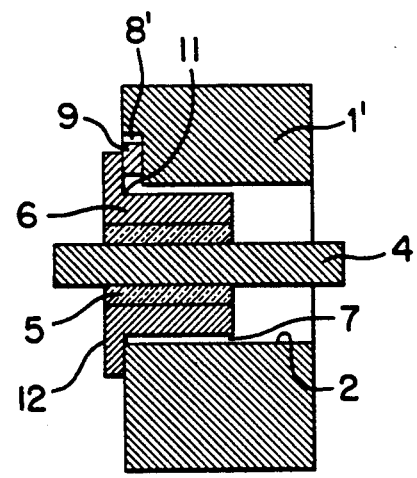
FIG. 4 is a sectional view of the variant shown in FIG. 3 and fitted with the brazed-joint assembly.

In an alternative form of construction of the reservoir shown in FIGS. 3 and 4, the reservoir 8' opens into the hole 2 of the wall 1', not through one of its ends but through one of its longitudinal sides. Although this form of construction suffers from a disadvantage in that it involves slightly greater losses of brazing materials by capillary diffusion on the surfaces of the reservoir 8' than in the case of the reservoir 8 of FIG. 2, each brazed-joint assembly can occupy a smaller height on the wall, depending on the prescribed general dimensions of the wall and therefore of the electronic component package as a function of the number of through-holes required for the lead-wires which are passed through the wall.

FIG. 3 is a front view of the wall alone whereas FIG. 4 shows the same wall provided with the lead-through element.

In order to form a hermetically sealed joint between the lead-through element and the wall, said element 3 is first positioned by insertion in the through-hole 2 until the head 12 is abuttingly applied on the wall 10. A preform 9 of solid brazing metal is then introduced into the reservoir 8. Finally, liquefaction and capillary diffusion of the brazing metal within the clearance space 7 are carried out by suitable heating means.

The heating means referred-to can consist, for example, of a furnace through which the brazed-joint assembly is passed. In the case of a package for electronic components, the entire package will be passed through the furnace once the reservoir or reservoirs corresponding to through-holes have been charged with solid brazing metal preforms.

Once the liquefaction and diffusion operation has been completed and consequently after the brazed-joint assembly has been withdrawn from the furnace, one makes sure that there remains within the reservoir 8 a quantity of brazing metal which has not diffused by capillarity within the clearance space 7, thus indicating that the space is full. To this end, it is sufficient to view the reservoir opening in order to determine whether the quantity of brazing metal contained in the solid preform 9 has completely filled the space 7 or whether it is necessary to pass the brazed-joint assembly through the furnace once again after reintroducing a fresh charge of solid brazing metal into the reservoir 8.

The alternative embodiment illustrated in FIG. 4 shows a form of construction in which the bushing 6 is shorter than the thickness of the wall 1'. This variant can correspond to the case in which the desired thermal characteristics entail the need to provide a wall of substantial thickness whereas the technical characteristics of resistance of the bond between lead-wire 4 and bead 5 which are in turn dependent on the diameter of the lead-wire 4 determine the length of the bushing 6.

As will be readily apparent, the invention is not limited in any sense to the distinctive features specified in the foregoing or to the details of the particular form of construction which has been chosen in order to illustrate the invention. All kinds of alternative arrangements may be made in the particular embodiment which has been described by way of example and in its constituent elements without thereby departing from the scope of the invention. This invention accordingly includes all technical equivalents of the means described as well as combinations of such means.

What is claimed is:

1. A brazed-joint assembly comprising a wall having a through-hole therein, a lead-through element adapted to be positioned within said through-hole with a clearance space, said lead-through element passing transversely through said wall, said wall comprising a reservoir formed on the face thereof and through which said lead-through element is inserted, said reservoir opening into said through-hole and having a charging access for introduction of a preform of solid brazing filler material.

2. A brazed-joint assembly of claim 1, wherein said reservoir is formed by recessing and removal of material from the face of said wall through which said lead-through element is inserted.

3. A brazed-joint assembly of claim 1, wherein said lead-through element contains an electric conductor surrounded by a bead of insulating material, said bead being in turn surrounded by a bushing of conductive material which is adapted to be brazed to said wall and passes from one side of said through-hole to the other.

4. A brazed-joint assembly of claim 3, wherein the length of said bushing is equal to or greater than the thickness of said wall.

5. A brazed-joint assembly of claim 3, wherein said bushing has a change of cross-section constituting a head adapted to bear on the face of the wall through which the bushing is inserted into said through-hole in order to be positioned therein.

6. A brazed-joint assembly of claim 1, wherein said reservoir has an elongated shape, one end of which opens into said through-hole.

7. A package for electronic components, said package comprising at least one brazed-joint obtained from a brazed-joint assembly of claim 1.

8. A package of claim 7, said package forming a closable enclosure wherein the reservoir is formed by recessing and removal of material from the external face of one wall of the enclosure.

* * * * *